United States Patent
Li et al.

(10) Patent No.: US 10,360,223 B2
(45) Date of Patent: Jul. 23, 2019

(54) SELECTING CONTENT ITEMS PROVIDED TO GROUPS INCLUDING A SOCIAL NETWORKING SYSTEM USER BASED ON INTERACTION WITH THE CONTENT ITEMS BY SOCIAL NETWORKING SYSTEM USERS

(71) Applicant: Facebook, Inc., Menlo Park, CA (US)

(72) Inventors: Yanping Li, Kirkland, WA (US); Li Ju, Issaquah, WA (US); Adit Vaidya, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 543 days.

(21) Appl. No.: 14/980,470

(22) Filed: Dec. 28, 2015

(65) Prior Publication Data
US 2017/0187813 A1    Jun. 29, 2017

(51) Int. Cl.
G06F 16/2457 (2019.01)
H04L 12/58 (2006.01)
H04L 29/08 (2006.01)
G06Q 50/00 (2012.01)
G06Q 30/02 (2012.01)

(52) U.S. Cl.
CPC ....... G06F 16/24578 (2019.01); G06Q 30/02 (2013.01); G06Q 50/01 (2013.01); H04L 51/14 (2013.01); H04L 51/32 (2013.01); H04L 67/306 (2013.01)

(58) Field of Classification Search
CPC ....... H04L 67/22; H04L 51/32; H04L 67/306; G06F 17/3053
See application file for complete search history.

(56) References Cited

U.S. PATENT DOCUMENTS

| | | | |
|---|---|---|---|
| 8,984,098 B1* | 3/2015 | Tomkins | G06F 17/30041 709/219 |
| 2005/0197846 A1* | 9/2005 | Pezaris | G06Q 10/0637 705/319 |
| 2006/0218225 A1* | 9/2006 | Hee Voon | G06Q 30/02 709/201 |
| 2009/0030927 A1* | 1/2009 | Cases | G06Q 10/06311 |
| 2010/0318571 A1* | 12/2010 | Pearlman | H04L 63/104 707/784 |
| 2011/0004831 A1* | 1/2011 | Steinberg | H04N 21/454 715/753 |
| 2011/0246574 A1* | 10/2011 | Lento | G06Q 10/10 709/204 |

(Continued)

*Primary Examiner* — Brian J. Gillis
*Assistant Examiner* — Javier O Guzman
(74) *Attorney, Agent, or Firm* — Fenwick & West LLP

(57) ABSTRACT

A social networking system maintains various groups that each include one or more users and maintains information describing interactions by users with the social networking system. The social networking system selects various content items provided to groups including the user based on amounts of interaction with content items provided to groups including the user by other social networking system users as well as amounts of time since the social networking system obtained various content items provided to the groups. Information describing the selected content items is presented to the user by the social networking system outside of pages of content maintained by the social networking system for groups to which the selected content items were provided.

21 Claims, 4 Drawing Sheets

(56) References Cited

U.S. PATENT DOCUMENTS

| | | | | |
|---|---|---|---|---|
| 2012/0066618 A1* | 3/2012 | Barker | ............... | G06F 17/30185 |
| | | | | 715/753 |
| 2013/0046766 A1* | 2/2013 | Shishido | ........... | G06F 17/30752 |
| | | | | 707/741 |
| 2014/0280185 A1* | 9/2014 | Nordstrom | ........ | G06F 17/30321 |
| | | | | 707/741 |
| 2016/0140216 A1* | 5/2016 | Allen | ................ | G06F 17/30657 |
| | | | | 707/722 |

* cited by examiner

SELECTING CONTENT ITEMS PROVIDED TO GROUPS INCLUDING A SOCIAL NETWORKING SYSTEM USER BASED ON INTERACTION WITH THE CONTENT ITEMS BY SOCIAL NETWORKING SYSTEM USERS

BACKGROUND

This disclosure relates generally to social networking systems, and more specifically to selecting content items for presentation to a user included in a group maintained by a social networking system.

An online system, such as a social networking system, allows its users to connect to and communicate with other online system users. Users may create profiles on an online system that are tied to their identities and include information about the users, such as interests and demographic information. The users may be individuals or entities such as corporations or charities.

Additionally, a social networking system may maintain groups of users, allowing a user to provide content to a group for presentation to each user included in the group. A group may be associated with a topic, with a location, or with any other suitable characteristic, so a user included in the group may more easily view or share content associated with the characteristic associated with the group. For example, users in a group provide content items to a group to simplify presentation of the content items to other users in the group. However, a user may be included in a large number of groups, which may receive significant numbers of content items from users in the groups. With a large number of content items provided to various groups including a user, the user may have difficulty identifying content items from the groups interesting or relevant to the user. This may decrease the likelihood of the user joining groups or providing content to groups, which may decrease the amount of interaction between the user and other users of the social networking system.

SUMMARY

Users of a social networking system communicate various content items, such as messages, images, or video data, to each other via the social networking system. To simplify communication of content items among users, the social networking system maintains various groups each including one or more users of the social networking system. A user may provide content items to a group, and the social networking system presents the content to the users included in the group. A user may provide content items to a group including the user for distribution to other users in the group or may view or otherwise access content items associated with the group including the user.

The social networking system may maintain a page for a group, with information provided to the group from various users presented on the page for the group. For example, the page identifies events associated with the group, images provided to the group by users included in the group, videos provided to the group by users included in the group, text data provided to the group by users in the group, identifying information of other users included in the group, or any other suitable information associated with the group. Additionally, the page for the group may include one or more interfaces allowing communication between users included in the group (e.g., a message board where users included in the group post messages accessible to users in the group, a messaging interface, a chat interface, or other suitable interface for communicating information between users in the group). In some embodiments, the social networking system limits access to the page for the group to users included in the group. For example, a user creating or administering the group associates a privacy setting with the group limiting access to content provided to the group and to the page for the group to users included in the group.

Users included in the group may provide content to the social networking system for presentation to other users in the group. When the social networking system receives content from a user for presentation to users in the group, the social networking system generates a content item including the received content and contextual information associated with the content (e.g., an identifier of the user from whom the content was received, a time when the content was received, a description of an action associated with the content). The social networking system presents the generated content item to users included in the group. For example, the social networking system presents the generated content item via a content feed presented in a messaging interface included in the page for the group (e.g., posting the content item to a content feed presented by the page for the group). Additionally, the social networking system may communicate notifications to users in the group when a content item is Users viewing the content item may perform various interactions with the content item via the social networking system. For example, a user may indicate a preference for the content item, may share the content item with other users, may comment on the content item, or perform other suitable interactions with the content item.

To allow a viewing user included in one or more groups to more easily access content items provided to groups including the viewing user, the social networking system identifies candidate content items as content items provided to one or more of the groups including the user that have not been viewed by the viewing user, and selects one or more candidate content items based on amounts of interaction with the content items by social networking system users. The social networking system presents information identifying the selected candidate content items to the viewing user. For example, if the viewing user is a member of three different groups, the social networking system identifies candidate content items as content items provided to each of the three groups within a specified time period (e.g., within two weeks of a current time) that have not been viewed by the viewing user. Based on amounts of interaction with different candidate content items by other users, the social networking system selects one or more of the candidate content items and provides the viewing user with information identifying the selected candidate content items.

In one embodiment, the social networking system computes a score for each candidate content item based on amounts of interaction with each candidate content item by other users of the social networking system. For example, the social networking system computes a score for a candidate content item based on a number of specific interactions with the candidate content item by users of the social networking system. As a specific example, the score for a candidate content item is a sum of a number of interactions with the candidate content item where users indicated a preference for the candidate content item, a number of interactions with the candidate content item where users shared the candidate content item with another user, and a number of interactions with the candidate content item where users commented on the candidate content item. In some embodiments, the social networking system associates different weights with different interactions and applies a weight associated with an interaction to a number of each interaction with a candidate content item. For example, a larger weight is associated with commenting on a candidate content item than is associated with indicating a preference for the candidate content item. The social networking system computes the score for a candidate content item by combining the numbers of the specific interactions after application of the weights. In some embodiments, the social networking system accounts for an amount of time since the candidate content item was obtained by the social networking system. For example, the social networking system applies a decay factor to a combination of numbers of specific interactions with the candidate content item that decreases as the time since the social networking system received the candidate content item increases. Additionally, the social networking system may account for types of content in a candidate content item when determining the score for the candidate content item. For example, the social networking system increases scores for candidate content items including video data or image data relative to candidate content items including text data and not including video data or image data.

Based on scores associated with candidate content items, the social networking system selects one or more candidate content items. In some embodiments, the social networking system selects candidate content items having at least a threshold score. Alternatively, the social networking system ranks candidate content items based on their scores and selects candidate content items having at least a threshold position in the ranking. For example, candidate content items having higher scores have higher positions in the ranking, and candidate content items having at least a threshold position in the ranking are selected.

The social networking system presents information describing the selected candidate content items to the viewing user outside of pages for groups to which the selected candidate content items were posted to increase a likelihood of the viewing user viewing the selected candidate content items. In some embodiments, the social networking system generates a content unit including the selected candidate content items. The content unit includes a display area presenting one or more of the selected candidate content items and a mechanism for modifying the selected candidate content items presented by the display area, if multiple candidate content items were selected. For example, the content unit includes instructions that identify one or more interactions with the content unit and present a different selected candidate content item in the display area when an identified interaction is performed. In some embodiments, the social networking system orders the selected candidate content items in the content unit based on their scores. For example, a selected candidate content item having a highest score relative to scores of other selected candidate content items is initially presented in the display area of the content unit, and selected candidate content items are presented in the display area in response to user interactions before selected candidate content items having lower scores.

Information describing the selected candidate content items may be presented to the viewing user in a variety of ways. For example, the social networking system generates a feed of content items for the viewing user including content items selected for the viewing user by the social networking system and includes a content unit including the selected candidate content item in the feed of content items. As another example, the social networking system presents the content unit including the selected candidate content item adjacent to the feed of content items selected for the viewing user. The viewing user may perform various interactions with content items included in the content unit, and one or more interactions with a content item in the content unit cause the social networking system to present a page for the group to which the content item with which the viewing user interacted was provided. Additionally, if the viewing user performs certain interactions with a content item in the content unit, the social networking system presents the viewing user with additional information associated with the content item with which the user interacted. For example, if the viewing user hovers a cursor over a content item in a content unit, the social networking system presents a summary or a preview of the content of the content item (e.g., via a pop-up window that includes a headline or the first few lines of text included in the content item). The content unit may include an option that, when selected by the user, present additional content items that are similar to a content item presented by the display area of the content unit (e.g., content items provided to a group including the content item presented by the display area of the content unit, content items having one or more characteristics matching characteristics of the content item presented by the display area of the content unit and provided to one or more groups including the viewing user). In one embodiment, if the viewing user is included in multiple groups and views information associated with a group including the viewing user, the content unit includes content items provided to the group about which the viewing user is viewing information and does not include content items provided to other groups including the viewing user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
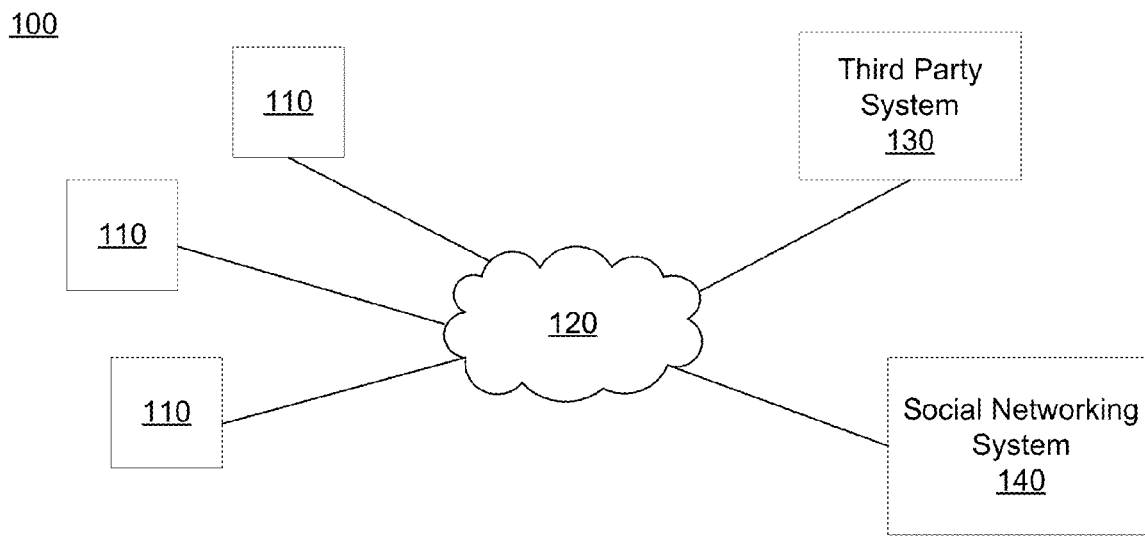
FIG. 1 is a block diagram of a system environment in which a social networking system operates, in accordance with an embodiment.

FIG. 1 is a block diagram of a system environment 100 for a social networking system 140, such as a social networking system. The system environment 100 shown by FIG. 1 comprises one or more client devices 110, a network 120, one or more third-party systems 130, one or more machines 135, and the social networking system 140. In alternative configurations, different and/or additional components may be included in the system environment 100. The embodiments described herein may be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
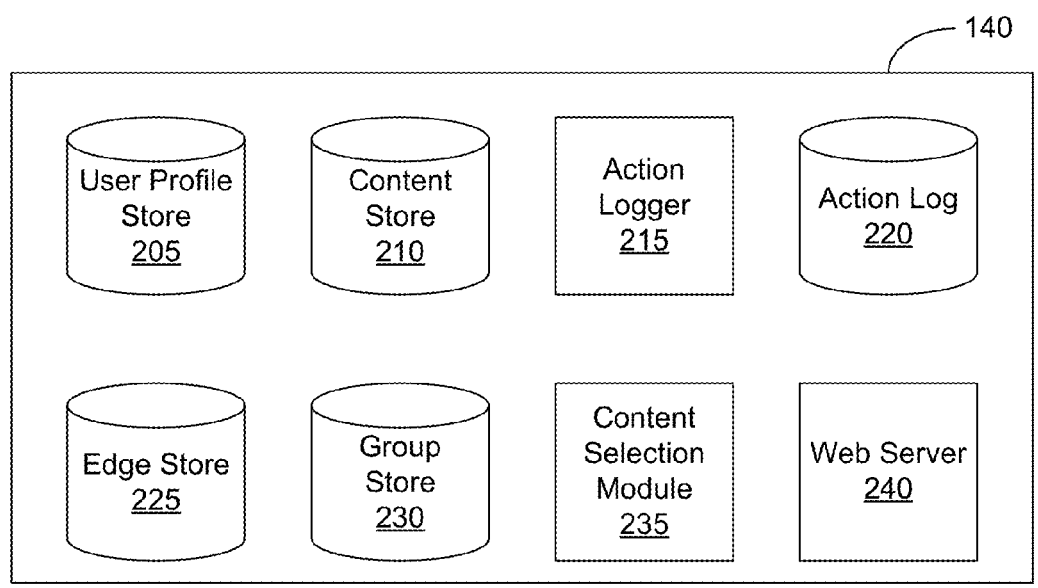
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a group store 230, a content selection module 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the social networking system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or in another user in the social networking system 140 based on the actions performed by the user. A user's affinity may be computed by the social networking system 140 over time to approximate the user's interest in an object, in a topic, or in another user in the social networking system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The group store 230 includes information identifying various groups of users. A group is associated with a group identifier stored by the group store 230 that uniquely identifies the group. One or more identifiers associated with users are associated with the group identifier to identify users of social networking system 140 included in the group. Other information may be associated with a group identifier, such as a name identifying a group corresponding to the group identifier, a description associated with the group, descriptive information associated with the group (e.g., a location), or other suitable information. Additionally, one or more content identifiers specifying content items are associated with a group identifier to identify content items associated with a group associated with the group identifier. If a content item, such as a message, is communicated to a group, the message is communicated to users associated with the group. Hence, maintaining a group allows content to be more easily communicated to users within the group by providing the content to the group rather than communicating the content to various individual users. A group may be generated by a user of the social networking system 140 identifying users associated with the group or the social networking system 140 may generate one or more groups based on characteristics associated with users of the social networking system 140. Additionally, a user's interactions with a group are identified in the action log 220 or in the group store 230 by associating a group identifier with information describing an interaction with the group.

In some embodiments, the group store 230 also includes information describing privacy settings associated with various groups. A privacy setting associated with a group identifies social networking system users authorized to access content provided to the group. For example, a privacy setting limits access to content provided to the group to users included in the group; such a privacy setting may also limit users capable of joining the group to users invited to join the group by users included in the group or to users who requested to join the group who were authorized to join the group by one or more users included in the group. Another privacy setting associated with a group allows users included in the group and users not included in the group to access content provided to the group and allows users not included in the group to join the group without limitation.

The content selection module 235 selects one or more content items for communication to a client device 110 to be presented to a user. Content items eligible for presentation to the user are retrieved from the content store 210 or from another source by the content selection module 235, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the user. For example, the content selection module 235 determines measures of relevance of various content items to the user based on characteristics associated with the user by the social networking system 140 and based on the user's affinity for different content items. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items eligible for presentation to the user may include advertisements from ad requests or other content items associated with bid amounts. The content selection module 235 uses the bid amounts associated with advertisement requests ("ad requests") when selecting content for presentation to the user. In various embodiments, the content selection module 235 determines an expected value associated with various ad requests (or other content items) based on their bid amounts and selects content items associated with a maximum expected value or associated with at least a threshold expected value for presentation. An expected value associated with an ad request or with a content item represents an expected amount of compensation to the social networking system 140 for presenting advertisement content from the ad request or for presenting the content item. For example, the expected value associated with an ad request is a product of the ad request's bid amount and a likelihood of the user interacting with the ad content from the ad request. The content selection module 235 may rank ad requests based on their associated bid amounts and select ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and with ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

Additionally, the content selection module 235 may identify content items for presentation to a viewing user from content items provided to groups including the user based on information in the content store 210 and in the group store 230. As further described below in conjunction with FIG. 3, the content selection module 235 identifies content items that have not been viewed by the viewing user and that were provided by users to one or more groups including the viewing user as candidate content items. Based on amounts of interaction with the candidate content items by other users of the social networking system 140, the content selection module 235 selects one or more candidate content items. In various embodiments, the content selection module 235 computes scores for each candidate content item based on number of different interactions with different candidate content items during a time interval. For example, a score for a candidate content item is a combination of a number of indications of preference for the candidate content item, a number of times the candidate content item was shared with another user, and a number of comments on the candidate content item. In some embodiments, the score also accounts for an amount of time since the candidate content item was obtained by the social networking system 140, so scores for more recently received or more recently generated candidate content items are higher than scores for less recently received or less recently generated candidate content items. Additional information may be used by the content selection module 235 to compute a score for a candidate content item in various embodiments. For example, interactions with a candidate content item by users connected to the viewing user may be weighted more heavily than interactions with the candidate content item by user not connected to the viewing user. As an additional example, if the content of a candidate content item is associated with a user to whom the viewing user is connected, the content selection module 235 increases a score for the candidate content item relative to scores for other candidate content items including content that is not associated with users to whom the viewing user is connected. Determining scores for candidate content items is further described below in conjunction with FIG. 3.

Based on scores for various candidate content items, the content selection module 235 selects one or more candidate content items for the viewing user. Information describing the selected candidate content items is presented to the viewing user by the content selection module 235. In some embodiments, the content selection module 235 generates a content unit including the selected candidate content items, a display area presenting one or more of the selected candidate content items, and instructions for modifying a candidate content item presented by the display area. The content selection module 235 may include the content unit in a feed of content selected for the viewing user or may present the content unit along with the feed of content selected for the viewing user in various embodiments. Presentation of information describing the selected candidate content items to the viewing user is further described below in conjunction with FIGS. 3-4B.

For example, the content selection module 235 receives a request to present a feed of content to a user of the social networking system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the user. For example, information describing actions associated with other users connected to the user or other data associated with users connected to the user is retrieved and used to select content items, such as content items describing actions associated with one or more of the other users. Additionally, one or more advertisement requests ("ad requests") may be retrieved from the content store 210. The retrieved content items or ad requests are analyzed by the content selection module 235 to identify candidate content items, including ad requests, eligible for presentation to the user. For example, content items associated with users who not connected to the user or content items associated with users for whom the user has less than a threshold affinity are discarded as candidate content items. Based on various criteria, the content selection module 235 selects one or more of the content items or ad requests identified as candidate content for presentation to the user. The selected content items or advertisements from selected ad requests are included in a feed of content that is presented to the user. For example, the feed of content includes at least a threshold number of content items describing actions associated with users connected to the user via the social networking system 140.

In various embodiments, the content selection module 235 presents content to a user through a feed including a plurality of content items selected for presentation to the user. One or more advertisements may also be included in the feed. The content selection module 235 may also determine the order in which selected content items or advertisements are presented via the feed. For example, the content selection module 235 orders content items or advertisements in the feed based on likelihoods of the user interacting with various content items or advertisements.

The web server 240 links the social networking system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the social networking system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Figure 3:
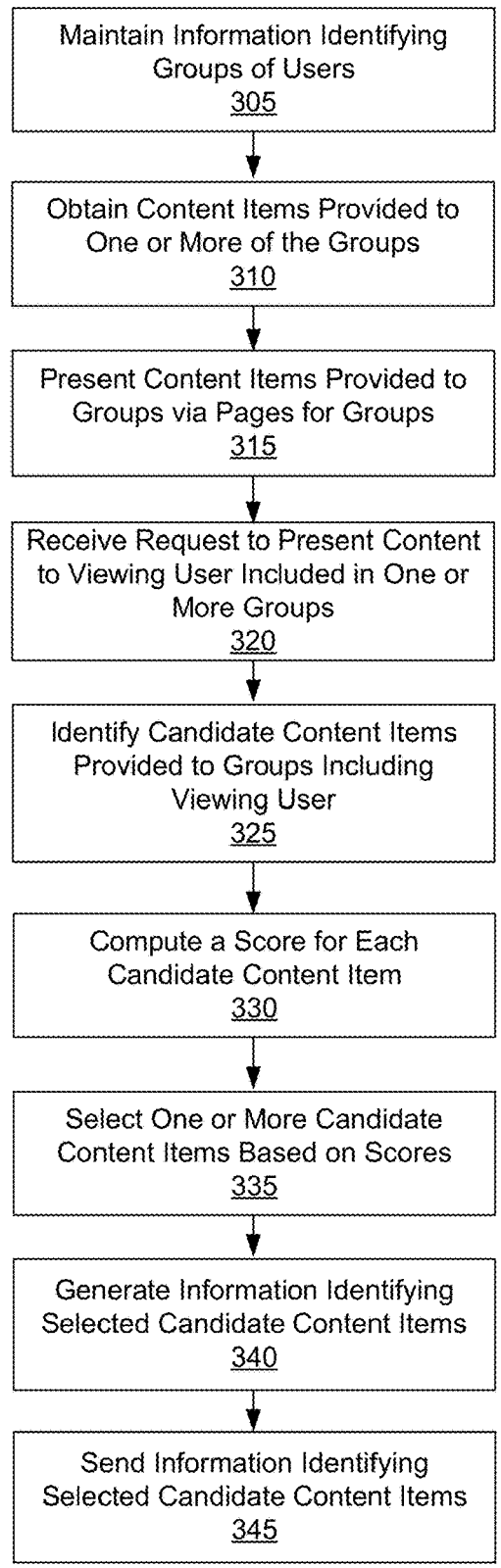
FIG. 3 is a flowchart of a method for identifying content items provided to groups maintained by a social networking system including a user to the user, in accordance with an embodiment.

Selecting Content Items from Groups Including a User for Presentation to the User FIG. 3 is a flowchart of one embodiment of a method for identifying content items provided to groups maintained by a social networking system 140 including a user to the user. In other embodiments, the method may include different and/or additional steps than those shown in FIG. 3. Additionally, steps of the method may be performed in different orders than the order described in conjunction with FIG. 3.

The social networking system 140 maintains 305 information identifying various groups of users. As described above in conjunction with FIG. 2, a group includes one or more users of the social networking system 140 and is associated with a group identifier uniquely identifying the group. One or more identifiers of users included in a group are associated with a group identifier to identify users of the social networking system 140 included in the group corresponding to the group identifier. Other information may be associated with a group identifier, such as a name identifying a group corresponding to the group identifier, a description associated with the group, descriptive information associated with the group (e.g., a location), topics associated with the group, a user that created the group, or other suitable information. A group may be generated by a user of the social networking system 140 identifying users associated with the group or the social networking system 140 may generate one or more groups based on characteristics associated with users of the social networking system 140. Interactions associated with a group, such as interactions between various users and the group, are also stored by the social networking system 140 by associating the group identifier with a description of an interaction along with user identifiers of one or more users associated with the interaction.

Additionally, the social networking system 140 obtains 310 content items provided to one or more of the groups from various users. A content item obtained 310 by the social networking system 140 may be content provided to a group by a user or may be information generated by the social networking system 140 describing an action performed by a user included in the group and communicated to the social networking system 140. When the social networking system 140 obtains 310 content items provided to a group, the social networking system 140 associates identifiers of the content items with a group identifier corresponding to the group to identify the content items as associated with the group. Various users included in a group may provide content items to the group, and the social networking system 140 obtains 310 the content items and associates them with the group. In some embodiments, users not included in the group may provide content items to one or more of the groups; alternatively, content may be obtained 310 for a group from users included in the group but not from users who are not included in the group. Hence, content items provided to a group may describe actions performed by users included in the group, actions associated with users included in the group, or content provided to the group from users.

The social networking system 140 maintains pages for each group and presents 315 content items provided to a group via a page for the group. Hence, users included in the group may access the page for the group to view content items provided to the group by various users. In various embodiments, a page for a group includes a feed in which content items provided to the group by users are presented. Additionally, the social networking system 140 may communicate notifications to users included in a group identifying content items provided to the group or actions performed by users included in the group. Different users may specify different settings for receiving notifications about content provided to a group including the user or about actions performed by users included in the group. For example, a user profile associated with a user and maintained by the social networking system 140 identifies a group including the user and actions by users in the group, so the social networking system 140 provides the user with a notification when a user in the group performs an identified action. The social networking system 140 may provide notifications to users via any suitable communication channel (e.g., text messaging, email, instant messaging, etc.).

The social networking system 140 receives 320 a request to present content to a viewing user of the social networking system 140 included in one or more groups. For example, a client device 110 associated with the viewing user communicates a request for content including an identifier associated with the viewing user to the social networking system 140. Based on stored information associated with the viewing user, the social networking system 140 identifies the one or more groups including the user. For example, the social networking system 140 identifies group identifiers associated with the identifier associated with the viewing user by the social networking system 140. As described above in conjunction with FIG. 2, the social networking system 140 associates identifiers of users included in a group with a group identifier corresponding to the group, so group identifiers associated with the identifier associated with the viewing user correspond to groups that include the viewing user.

From the groups including the viewing user, the social networking system 140 identifies 325 content items provided to the groups including the viewing user that have not been viewed by the viewing user as candidate content items. In some embodiments, the social networking system 140 identifies 325 candidate content items as content items provided to groups including the viewing user within a specific time interval (e.g., within two weeks of a current time, within a day of a current time) that the viewing user has not viewed. Based on interactions by other users with the candidate content items, the social networking system 140 computes 330 a score for each candidate content item. The score for a candidate content item provides a measure of a likelihood of the viewing user interacting with the candidate content item.

In various embodiments, the score computed 330 for a candidate content item is based on a number of occurrences of specific type of interactions with the candidate content item by social networking system users. For example, the social networking system 140 computes 335 a score for a candidate content item by combining a numbers of times users have indicated a preference for the candidate content item, shared the candidate content item with other users, and commented on the candidate content item. However, in other embodiments, the social networking system 140 computes 330 the score for the candidate content item based on numbers of occurrences of any suitable interactions with the candidate content item by social networking system users. In various embodiments, the social networking system 140 computes 330 a score for each candidate content item representing amount of interaction with each candidate content item. Alternatively, the social networking system 140 determines a number of unique users performing at least one interaction from a set of interactions (e.g., indicated a preference for the candidate content item, shared the candidate content item with another user, commented on the candidate content item) with the candidate content item and computes 330 the score for the candidate content item based on the determined number of unique users. In some embodiments, the social networking system 140 associates different weights with different interactions and applies a weight associated with an interaction to a number of the interaction with the candidate content item. For example, a larger weight is associated with commenting on the candidate content item than is associated with indicating a preference for the candidate content item. Hence, a number of unique users performing different interactions with a candidate content item or a number of occurrences of different interactions with the candidate content item is scaled by the weights associated with the different interactions when the social networking system 140 computes 330 the score for the candidate content item. Additionally, the social networking system 140 may associate higher weights with interactions performed by additional users connected to the user via the social networking system 140 in some embodiments, so interactions with a candidate content item by additional users connected to the user have a greater influence on the score for the identified content item.

The social networking system 140 may account for an amount of time since a candidate content item was obtained 310 by the social networking system 140 when computing 330 the score for the candidate content item. For example, the social networking system 140 applies a decay factor to a combination of interactions with the candidate content item or to a combination of unique users performing different interactions with the candidate content item to compute 330 the score for the candidate content item. In various embodiments, the decay factor is inversely related (e.g., inversely proportional) to the amount of time since the social networking system 140 obtained 310 the candidate content item, so the combination of interactions or unique users is more significantly attenuated as the amount of time since the social networking system 140 obtained the candidate content item increases.

Additionally, the social networking system 140 may account for types of content in a candidate content item when computing 330 the score for the candidate item. Example types of content in a candidate content item include: video data, text data, image data, and audio data. For example, the social networking system 140 increases scores for candidate content items including video data or image data relative to candidate content items including text data and not including video data or image data. In some embodiments, the social networking system 140 may differently modify scores of candidate content items based on types of content in the candidate content item based on prior interactions by the viewing user with content items including different types of content. For example, if the viewing user more frequently interacts with content items including text data than with content items including audio data, the social networking system 140 increases scores for candidate content items including text data relative to scores for candidate content items including audio data.

Additional factors may be used by the social networking system 140 when computing 330 scores for candidate content items in various embodiments. For example, a score computed 330 for a candidate content item associated with or identifying an additional user or an object connected to the viewing user may be increased relative to scores computed 330 for candidate content items that are not associated with or do not include additional users or additional objects connected to the viewing user. As another example, the social networking system 140 associates higher weights with interactions by users connected to the viewing user with a candidate content item than weights associated with interactions by users not connected to the viewing user with the candidate content item when computing 330 the score for the candidate content item.

Based on the scores for candidate content items, the social networking system 140 selects 335 one or more candidate content items. In some embodiments, the social networking system 140 selects 335 candidate content items having at least a threshold score. Alternatively, the social networking system 140 ranks candidate content items based on their scores and selects 335 candidate content items having at least a threshold position in the ranking. For example, the social networking system 140 ranks candidate content items so candidate content items with higher scores have higher positions in the ranking and selects 340 candidate content items having at least a threshold position in the ranking.

Figure 4A:
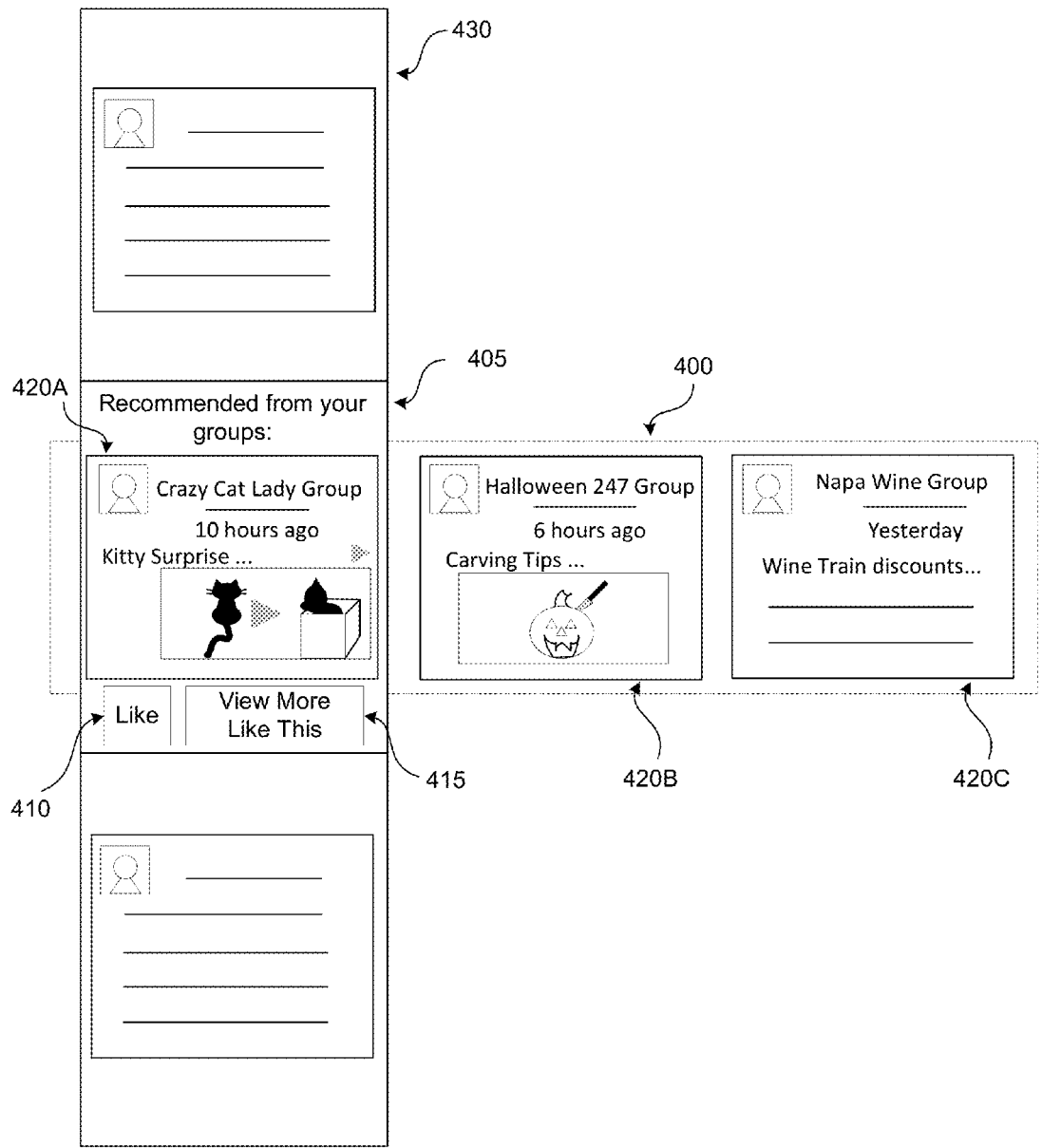
FIG. 4A is an example scrollable content unit presented within a feed of content items, in accordance with an embodiment.

The social networking system 140 generates 340 information identifying the selected candidate content items for presentation to the viewing user. In various embodiments, the social networking system 140 generates 340 a content unit including the selected candidate content items, a display area presenting at least one of the selected candidate content items, and instructions for modifying one or more selected candidate content items presented by the display area. For example, the instructions in the content unit identify one or more interactions with the content unit that modify a candidate content item presented by the display area of the content unit. FIG. 4A shows an example content unit 400 including a display area 405 presenting one or more content items 420A-C and modifies one or more content items 420A-C presented in the display area 405 in response to one or more interactions with the content unit 400. For example, based on interactions with the content unit 400, the display area 405 scrolls through presentation of content items 420A-C based on a sequence of the candidate content items 420A-C. In some embodiments, the sequence in which the candidate content items 420A-C are presented by the display area 405 is based at least in part on scores for various candidate content items 420A-C. For example, candidate content items 420A-C with higher scores are positioned in the sequence so they are presented by the display area 405 prior to candidate content items 420A-C having lower scores.

In various embodiments, the viewing user may interact with a candidate content item 420A-C presented in the display area 405 of the content unit 400. For example, the viewing user indicates a preference for a candidate content item 420A-C, shares a candidate content item 420A-C, or comments on the candidate content item 420A-C by interacting with the display area 405 of the content unit 400 presenting the candidate content item 420A-C. Interface elements 410 may be presented in the display area 405 allowing the user to perform an interaction with a presented candidate content item 420A-C by accessing an interface element. For example, an interface element 410 presented in the display area 405 along with a presented candidate content item 420A-C allows the user to indicate a preference for the presented candidate content item 420A-C by interacting with the interface element 410. Alternatively or additionally, various gestures are associated with different interactions, allowing the viewing user to perform an interaction by performing a gesture corresponding to the interaction with a portion of a display device of a client device 110 presenting the display area 405 of the content unit 400. In some embodiments, the display area 405 of the content unit 400 also presents an interface element 415 that, when selected by the viewing user, presents information identifying additional content items having one or more characteristics matching characteristics of content items 420A-C included in the content unit 400. For example, accessing the interface element 415 causes the social networking system 140 to present the viewing user with additional content items provided to a group to which a candidate content item 420A-C presented by the display area 405 was provided. In other embodiments, the additional content items may have any suitable characteristic or characteristics matching a characteristic or characteristics of the candidate content item 420A-C presented by the display area 405.

Figure 4B:
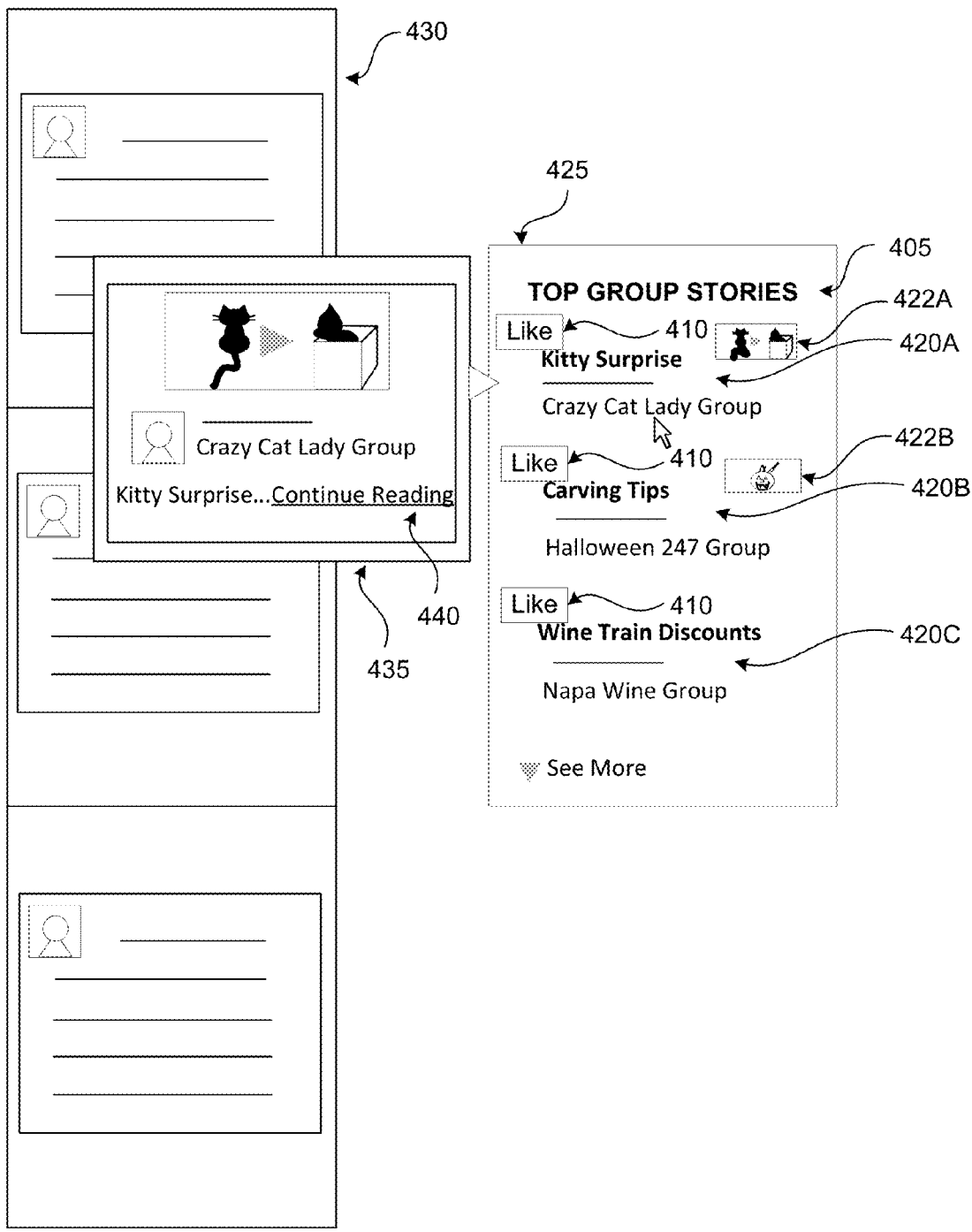
FIG. 4B is an example display window presenting a preview of a content item included in a content unit, in accordance with an embodiment.

The social networking system 140 sends 345 the information describing the selected candidate content items, such as a content unit including the selected candidate content items, to a client device 110 for display to the viewing user outside of pages associated with one or more groups to which the selected candidate content items were provided. For example, the social networking system 140 includes a content unit including the selected candidate content items in a feed of content selected by the social networking system 140 for the viewing user and sent 345 to a client device 110 for presentation to the user. As another example, the social networking system 140 sends 345 the content unit including the selected candidate content items to a client device 110 for presentation adjacent to the feed of content selected for the viewing user by the social networking system 140 or independent of other content provided to the viewing user by the social networking system 140. FIG. 4A shows an example where the content unit 400 is displayed in a feed 430 of content items selected for the viewing user by the social networking system 140. However, FIG. 4B shows an example where the social networking system 140 displays a content unit 425 including the selected content items 420A-C adjacent to a feed 430 of content items selected for the viewing user by the social networking system 140. In the example shown by FIG. 4B, the content unit 425 presents an interface element 410 proximate to information identifying each of the selected content items 420A-C, allowing the viewing user to indicate a preference for a selected content item 420A-C by accessing the interface element presented proximate to information in the content unit 425 identifying a selected content item 420A-C. Additionally, the content unit 425 presents a portion of content from various selected content items 420A-C in some embodiments. For example, the content unit 425 presents an image included in a selected content item 420A-C including image data in the information identifying the selected content item 420A-C or presents a frame of video data included in a selected content item 420A-C in the information including the selected content item 420A-C. For example, in FIG. 4B, selected content item 420A includes video data, so a frame 422A of the video data is presented in the content unit 425 as a portion of the information identifying selected content item 420A. Similarly, selected content item 420B includes image data, so the image date 422B is presented in the content unit 425 as a portion of the information identifying selected content item 420B. In various embodiments, the online system 140 maintains one or more rules to identify a portion of content from a selected content item 420A-C to present in the content unit 425; the rules may be based on types of content included in a selected content item 420A-C. For example, rules specify presentation of a frame of video data from a selected content item 420A-C if the selected content item 420A-C includes video data or specify presentation of image data from a selected content item 420A-C if a selected content item 420A-C includes image data and does not include video data.

In various embodiments, the social networking system 140 presents additional information associated with a selected candidate content item 420A-C included in a content unit 400, 425 if the social networking system 140 receives certain interactions with a candidate content item 420A-C presented by a display area 405 of the content unit 400, 425 (e.g., selecting a specific interface element, performing one or more gestures with a portion of a display device of a client device 110 presenting the display area 405). For example, FIG. 4B shows an example where the social networking system 140 presents an additional interface 435 including additional information associated with a selected candidate content item 420A-C from the content unit 425. Additional information associated with a selected candidate content item 420A-C may be a summary or a preview of information included in the selected candidate content item 420A-C, video or image date included in the selected candidate content item 420A-C, text included in the selected candidate content item 420A-C, a title or a user associated with the candidate content item 420A-C or any other suitable information from the selected candidate content item 420A-C. The additional interface 435 may include an interface element 440 that, when accessed by the viewing user, presents the candidate content item 420A-C for which additional information is presented in the additional interface 435.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   maintaining by a group store of a social networking system, stored associations between a group identifier for a group and user identifiers for one or more users of the social networking system;
   obtaining content items provided to the group by users of the social networking system;
   storing associations between identifiers for the content items and the group identifier for the group;
   presenting one or more of the content items associated with the group via a page of information for the group maintained by the social networking system and accessible by the one more users associated with the group;
   receiving a request to present content to a viewing user of the social networking system that is a member of the group in a content unit feed for the viewing user presented on a content page external from the page of information for the group;
   identifying an association between a user identifier of the viewing user and the group identifier for the group in the group store;
   identifying candidate content items of the one or more content items presented via the page of information to the group that have not been previously presented to the viewing user;
   computing a score for each of the candidate content items, the score for each candidate content item based at least in part on a type of content included in the candidate content item, an amount of interaction with the candidate content item by other users of the social networking system and a time since the candidate content item was obtained by the social networking system;
   ranking the candidate content items based at least in part on the scores;
   selecting one or more of the candidate content items based at least in part on the ranking;
   generating a content unit including the one or more selected candidate content items; and
   sending the content unit for display to the viewing user in the content unit feed on the content page outside of the page associated with the group to which the one or more selected candidate content items were provided.

2. The method of claim 1, wherein computing the score for each of the candidate content items comprises:

computing the score for each of the candidate content items based at least in part on a number of one or more specific interactions with the candidate content item by other users of the social networking system, the type of content included in the candidate content item, and the time since the candidate content item was obtained by the social networking system.

3. The method of claim 2, wherein the one or more specific interactions with the candidate content item are selected from a group consisting of: indicating a preference for the candidate content item, commenting on the candidate content item, sharing the candidate content item with another user of the social networking system, and any combination thereof.

4. The method of claim 2, wherein computing the score for each of the candidate content items comprises:
associating a weight with each of the one or more specific interactions; and
determining scores for each of the candidate content items based at least in part on the weights associated with each of the one or more specific interactions, the type of content included in the candidate content item, and the time since the candidate content item was obtained by the social networking system.

5. The method of claim 1, wherein the type of content included in the candidate content item is selected from a group consisting of: text data, image data, video data, audio data, and any combination thereof.

6. The method of claim 1, wherein computing the score for each of the candidate content items comprises:
computing the score for each of the candidate content items based at least in part on a number of unique users of the social networking system who performed one or more specific interactions with the candidate content item by other users of the social networking system, the type of content included in the candidate content item and the time since the candidate content item was obtained by the social networking system.

7. The method of claim 6, wherein the one or more specific interactions with the candidate content item are selected from a group consisting of: indicating a preference for the candidate content item, commenting on the candidate content item, sharing the candidate content item with another user of the social networking system, and any combination thereof.

8. The method of claim 1, wherein selecting one or more of the candidate content items based at least in part on the ranking comprises:
selecting candidate content items having at least a threshold position in the ranking.

9. The method of claim 1, wherein the content unit including the one or more selected candidate content items includes a display area presenting one or more of the selected candidate content items and instructions for modifying the one or more selected candidate content items presented by the display area.

10. The method of claim 1, wherein the content unit further includes an interface element proximate to information identifying a selected candidate content item that indicates a preference for the selected candidate content item when accessed by the viewing user.

11. The method of claim 1, wherein the content unit further includes an interface element that presents one or more additional content items having one or more characteristics matching characteristics of a content item presented by the display area when accessed by the viewing user.

12. The method of claim 11, wherein the one or more additional content items comprise content items provided to a group to which the content item presented by the display area was provided.

13. The method of claim 1, wherein generating the content unit including the one or more selected candidate content items comprises:
selecting content from one or more of the selected candidate content items for presentation by the content unit, content from a selected candidate content item for presentation by the content unit based at least in part on types of content included in the selected candidate content item.

14. The method of claim 1, wherein sending the content unit for presentation to the viewing user outside of the page associated with the group to which the one or more selected candidate content items were provided comprises:
including the content unit in a feed of content selected for the viewing user by the social networking system and sent to a client device for presentation to the viewing user.

15. A computer program product comprising a non-transitory computer readable storage medium having instructions encoded thereon that, when executed by a processor, cause the processor to:
maintain by a group store of a social networking system, stored associations between a group identifier for a group and user identifiers for one or more users of the social networking system;
obtain content items provided to the group by users of the social networking system;
store associations between identifiers for the content items and the group identifier for the group;
present one or more of the content items associated with the group via a page of information for the group maintained by the social networking system and accessible by the one more users associated with the group;
receive a request to present content to a viewing user of the social networking system that is a member of the group in a content unit feed for the viewing user presented on a content page external from the page of information for the group;
identify an association between a user identifier of the viewing user and the group identifier for the group in the group store;
identify candidate content items of the one or more content items presented via the page of information to the group that have not been previously presented to the viewing user;
compute a score for each of the candidate content items, the score for each candidate content item based at least in part on a type of content included in the candidate content item, an amount of interaction with the candidate content item by other users of the social networking system and a time since the candidate content item was obtained by the social networking system;
rank the candidate content items based at least in part on the scores;
select one or more of the candidate content items based at least in part on the ranking; generate a content unit including the one or more selected candidate content items;
and send the content unit for display to the viewing user in the content unit feed on the content page outside of the page associated with the group to which the one or more selected candidate content items were provided.

16. The computer program product comprising a non-transitory computer readable storage medium of claim 15, wherein the instructions to compute the score for each of the candidate content items comprise instruction that when executed by the processor cause the processor to: compute the score for each of the candidate content items based at least in part on a number of one or more specific interactions with the candidate content item by other users of the social networking system, the type of content included in the candidate content item, and the time since the candidate content item was obtained by the social networking system.

17. The computer program product comprising a non-transitory computer readable storage medium of claim 16, wherein the one or more specific interactions with the candidate content item are selected from a group consisting of: indicating a preference for the candidate content item, commenting on the candidate content item, sharing the candidate content item with another user of the social networking system, and any combination thereof.

18. The computer program product comprising a non-transitory computer readable storage medium of claim 16, wherein the instructions to compute the score for each of the candidate content items comprise instructions that when executed by the processor cause the processor to: associate a weight with each of the one or more specific interactions; and determine scores for each of the candidate content items based at least in part on the weights associated with each of the one or more specific interactions, the type of content included in the candidate content item, and the time since the candidate content item was obtained by the social networking system.

19. The computer program product comprising a non-transitory computer readable storage medium of claim 15, wherein the type of content included in the candidate content item is selected from a group consisting of: text data, image data, video data, audio data, and any combination thereof.

20. The computer program product comprising a non-transitory computer readable storage medium of claim 15, wherein the instructions to compute the score for each of the candidate content items comprise instructions that when executed by the processor cause the processor to: compute the score for each of the candidate content items based at least in part on a number of unique users of the social networking system who performed one or more specific interactions with the candidate content item by other users of the social networking system, the type of content included in the candidate content item and the time since the candidate content item was obtained by the social networking system.

21. The computer program product comprising a non-transitory computer readable storage medium of claim 20, wherein the one or more specific interactions with the candidate content item are selected from a group consisting of: indicating a preference for the candidate content item, commenting on the candidate content item, sharing the candidate content item with another user of the social networking system, and any combination thereof.

* * * * *